United States Patent
Young et al.

(10) Patent No.: US 12,099,640 B2
(45) Date of Patent: *Sep. 24, 2024

(54) SYSTEM FOR REAL-TIME AUTHENTICATED OBFUSCATION OF ELECTRONIC DATA

(71) Applicant: BANK OF AMERICA CORPORATION, Charlotte, NC (US)

(72) Inventors: Michael Robert Young, Davidson, NC (US); Manu Jacob Kurian, Dallas, TX (US); Jo-Ann Taylor, Goldalming (GB)

(73) Assignee: BANK OF AMERICA CORPORATION, Charlotte, NC (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/560,047

(22) Filed: Dec. 22, 2021

(65) Prior Publication Data

US 2022/0114288 A1  Apr. 14, 2022

Related U.S. Application Data

(63) Continuation of application No. 16/401,641, filed on May 2, 2019, now Pat. No. 11,250,169.

(51) Int. Cl.
| | |
|---|---|
| G06F 21/84 | (2013.01) |
| G06F 3/01 | (2006.01) |
| G06F 21/60 | (2013.01) |
| G06F 21/62 | (2013.01) |
| H04L 9/32 | (2006.01) |

(52) U.S. Cl.
CPC .............. G06F 21/84 (2013.01); G06F 3/013 (2013.01); G06F 21/602 (2013.01); G06F 21/6245 (2013.01); H04L 9/3228 (2013.01)

(58) Field of Classification Search
CPC . H04L 9/3228; G06F 21/602; G06F 21/6245; G06F 21/32; G06F 3/013; G06F 21/84
See application file for complete search history.

(56) References Cited

U.S. PATENT DOCUMENTS

| | | | |
|---|---|---|---|
| 6,067,069 A | 5/2000 | Krause | |
| 6,275,934 B1* | 8/2001 | Novicov | H04L 63/0807 713/168 |
| 6,373,947 B1* | 4/2002 | Pomerantz | H04N 1/4486 715/236 |

(Continued)

OTHER PUBLICATIONS

NPL Search Terms (Year: 2023).*

(Continued)

*Primary Examiner* — Syed A Zaidi
(74) *Attorney, Agent, or Firm* — Moore & Van Allen PLLC; Seongun M. Hong

(57) ABSTRACT

A system for real-time authenticated obfuscation of electronic data provides real-time visual obfuscation of the data by transforming displayed data into undecipherable data when viewed by an unauthorized user while maintaining access for an authorized user. The system may further provide application-level obfuscation of electronic data via cryptographic keys such that only authorized applications may decrypt the encrypted data. In this way, the system provides secure access control of electronic data within a networked environment.

9 Claims, 3 Drawing Sheets

(56) References Cited

U.S. PATENT DOCUMENTS

| | | | |
|---|---|---|---|
| 7,346,769 B2* | 3/2008 | Forlenza | H04L 9/00 713/168 |
| 7,484,107 B2* | 1/2009 | Forlenza | G06F 21/6209 713/193 |
| 7,620,987 B2 | 11/2009 | Shelest et al. | |
| 7,706,532 B2* | 4/2010 | Ito | H04N 21/43072 713/1 |
| 8,015,417 B2 | 9/2011 | Kato et al. | |
| 8,117,458 B2 | 2/2012 | Osborn, III et al. | |
| 8,732,477 B2 | 5/2014 | Osborn et al. | |
| 8,739,260 B1 | 5/2014 | Damm-Goossens | |
| 8,776,194 B2 | 7/2014 | Hitchcock et al. | |
| 9,021,254 B2 | 4/2015 | Bokarius et al. | |
| 9,185,096 B2 | 11/2015 | Avni et al. | |
| 9,223,995 B1 | 12/2015 | Lavinio | |
| 9,646,143 B2 | 5/2017 | Lavinio | |
| 9,753,931 B2 | 9/2017 | Burshteyn | |
| 9,767,585 B1 | 9/2017 | Carter, Jr. et al. | |
| 9,836,612 B2 | 12/2017 | Li | |
| 9,898,473 B2 | 2/2018 | Burshteyn | |
| 10,102,398 B2 | 10/2018 | Neergaard | |
| 10,930,246 B2 | 2/2021 | Yun et al. | |
| 11,152,105 B2 | 10/2021 | Ohashi | |
| 2003/0190044 A1 | 10/2003 | Higashi et al. | |
| 2005/0246619 A1* | 11/2005 | Krause | G06F 3/04812 715/201 |
| 2008/0209231 A1* | 8/2008 | Kim | H04L 9/00 713/189 |
| 2012/0079282 A1 | 3/2012 | Lowenstein et al. | |
| 2013/0019104 A1* | 1/2013 | Halas | G06F 21/6227 713/189 |
| 2013/0212250 A1* | 8/2013 | Kleppner | G06F 16/9535 709/224 |
| 2013/0218845 A1* | 8/2013 | Kleppner | G06F 40/166 707/687 |
| 2013/0314208 A1 | 11/2013 | Risheq et al. | |
| 2014/0078164 A1* | 3/2014 | Chan | H04N 5/33 345/589 |
| 2014/0351951 A1 | 11/2014 | Ronchi et al. | |
| 2016/0197919 A1 | 7/2016 | Senthurpandi | |
| 2016/0342608 A1 | 11/2016 | Burshteyn | |
| 2017/0035184 A1 | 2/2017 | Sagel | |
| 2017/0140174 A1* | 5/2017 | Lacey | G06Q 20/4016 |
| 2017/0163519 A1 | 6/2017 | Bowers et al. | |
| 2017/0235955 A1 | 8/2017 | Barkan | |
| 2018/0241760 A1 | 8/2018 | Stephens | |
| 2018/0307806 A1* | 10/2018 | Glazner | H04N 21/816 |
| 2018/0321739 A1* | 11/2018 | Park | G06F 3/04842 |
| 2021/0191512 A1 | 6/2021 | Ho et al. | |

OTHER PUBLICATIONS

NPL Search Terms (Year: 2024).*
Ahmed Waleed et al., Oracle Corporation, Oracle Database 12c, an oracle white paper, Jun. 2013; Data masking best practice; 26 pages.
U.S. Appl. No. 16/401,641, filed May 2, 2019, U.S. Pat. No. 11,250,169, Feb. 15, 2022.

* cited by examiner

```
                                          ┌─ 200
```

```
┌─────────────────────────────────────────────────────────────────┐
│  RECEIVE, FROM A VISUAL DATA DECRYPTION DEVICE, A REQUEST TO    │
│              ACCESS A SET OF PROTECTED DATA                     │
│                              201                                │
└─────────────────────────────────────────────────────────────────┘
                                │
                                ▼
┌─────────────────────────────────────────────────────────────────┐
│    AUTHENTICATE THE VISUAL DATA DECRYPTION DEVICE USING         │
│                 AUTHENTICATION CREDENTIALS                      │
│                              202                                │
└─────────────────────────────────────────────────────────────────┘
                                │
                                ▼
┌─────────────────────────────────────────────────────────────────┐
│   RECEIVE A CRYPTOGRAPHIC PRIVATE KEY FROM THE VISUAL DATA      │
│  DECRYPTION DEVICE, WHEREIN THE CRYPTOGRAPHIC PRIVATE KEY IS    │
│            ASSOCIATED WITH THE SET OF PROTECTED DATA            │
│                              203                                │
└─────────────────────────────────────────────────────────────────┘
                                │
                                ▼
┌─────────────────────────────────────────────────────────────────┐
│     DETECT A CONFIGURATION OF THE VISUAL DATA DECRYPTION DEVICE │
│                              204                                │
└─────────────────────────────────────────────────────────────────┘
                                │
                                ▼
┌─────────────────────────────────────────────────────────────────┐
│  BASED ON THE CONFIGURATION OF THE VISUAL DATA DECRYPTION       │
│  DEVICE, PROVIDE THE SET OF PROTECTED DATA ASSOCIATED WITH THE  │
│  CRYPTOGRAPHIC PRIVATE KEY TO THE VISUAL DATA DECRYPTION        │
│                      DEVICE FOR DECRYPTION                      │
│                              205                                │
└─────────────────────────────────────────────────────────────────┘
```

SYSTEM FOR REAL-TIME AUTHENTICATED OBFUSCATION OF ELECTRONIC DATA

CROSS-REFERENCE TO RELATED APPLICATION

The present application is a continuation of co-pending U.S. patent application Ser. No. 16/401,641, of the same title and filed on May 2, 2019, which is assigned to the assignee hereof and the contents thereof are hereby expressly incorporated by reference herein.

FIELD OF THE INVENTION

The present disclosure embraces a system for real-time authenticated obfuscation of electronic data. In particular, the system provides a way to selectively provide visual and/or application-level access to encrypted data.

BACKGROUND

Conventional computing systems face numerous technical challenges in maintaining electronic data privacy. Accordingly, there is a need for a more secure way to provide access to electronic data.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for real-time authenticated obfuscation of electronic data. The system may provide real-time visual obfuscation of the data by transforming displayed data into undecipherable data when viewed by an unauthorized user while maintaining access for an authorized user. The system may further provide application-level obfuscation of electronic data via cryptographic keys such that only authorized applications may decrypt the encrypted data. In this way, the system provides secure access control of electronic data within a networked environment.

Accordingly, embodiments of the present disclosure provide a system for real-time authenticated visual obfuscation of electronic data. The system may comprise a memory device with computer-readable program code stored thereon; a communication device; and a processing device operatively coupled to the memory device and the communication device. The processing device may be configured to execute the computer-readable program code to receive, from a visual data decryption device, a request to access a set of protected data; receive authentication credentials from the visual data decryption device; authenticate the visual data decryption device using the authentication credentials; receive a cryptographic private key from the visual data decryption device, wherein the cryptographic private key is associated with the set of protected data; detect a configuration of the visual data decryption device; and based on the configuration of the visual data decryption device, provide the set of protected data to the visual data decryption device.

In some embodiments, the computer-readable program code further causes the processing device to detect a presence of an unauthorized user; and perform visual obfuscation of the protected data, wherein the visual obfuscation causes the protected data to be undecipherable.

In some embodiments, detecting the configuration of the visual data decryption device comprises detecting one of an eye position of the user, eye orientation of the user, angle of incidence between an eye of the user and an external display, a line of sight of the user.

In some embodiments, the computer-readable program code further causes the processing device to, based on detecting the configuration of the visual data decryption device, determine a reading speed and reading position of the user; and based on the reading speed of the user, selectively provide a subset of the set of protected data to the visual data decryption device, wherein the subset of the set of protected data is associated with the reading speed and reading position of the user.

In some embodiments, the computer-readable program code further causes the processing device to present decrypted data via an image on a display device; detect a line of sight of the user; and manipulate the image, wherein manipulating the image causes the image to be readable only from the line of sight of the user.

In some embodiments, the computer-readable program code further causes the processing device to detect a presence of an unauthorized device; and based on detecting the presence of the unauthorized device, dynamically adjusting a brightness of a display to cause under-exposure or over-exposure of the display.

In some embodiments, the visual data decryption device is a virtual reality headset, augmented reality headset, pair of smart glasses, pair of smart goggles, or pair of smart contacts.

In some embodiments, the visual data decryption device is an integrated smart component of a display device.

In some embodiments, the computer-readable program code further causes the processing device to detect that the cryptographic private key is subject to a time restriction; determine that the time restriction has been exceeded; and automatically disable access to the set of protected data.

Embodiments of the present disclosure also provide a system for real-time authenticated application-level obfuscation of electronic data. The system may comprise a memory device with computer-readable program code stored thereon; a communication device; and a processing device operatively coupled to the memory device and the communication device. The processing device may be configured to execute the computer-readable program code to receive, from an application, a request to access a set of protected data; receive authentication credentials from the application; authenticate the application using the authentication credentials; receive a cryptographic private key from the application, wherein the cryptographic private key is associated with the set of protected data; and provide the set of protected data to the application.

In some embodiments, the computer-readable program code further causes the processing device to detect that the cryptographic private key is subject to a time restriction; determine that the time restriction has been exceeded; and automatically disable access to the set of protected data.

In some embodiments, providing the set of protected data to the application comprises decrypting the set of protected data to generate decrypted data; and automatically transferring the decrypted data to the application.

In some embodiments, the computer-readable program code further causes the processing device to re-encrypt the decrypted data upon completion of an application process.

In some embodiments, the authentication credentials comprise a secure token, application identifier, or authorization key.

Embodiments of the present disclosure also provide a computer-implemented method for real-time authenticated visual obfuscation of electronic data. The method may comprise receiving, from a visual data decryption device, a request to access a set of protected data; receiving authentication credentials from the visual data decryption device; authenticating the visual data decryption device using the authentication credentials; receiving a cryptographic private key from the visual data decryption device, wherein the cryptographic private key is associated with the set of protected data; detecting a configuration of the visual data decryption device; and based on the configuration of the visual data decryption device, providing the set of protected data to the visual data decryption device.

In some embodiments, the method further comprises detecting a presence of an unauthorized user; and performing visual obfuscation of the protected data, wherein the visual obfuscation causes the protected data to be undecipherable.

In some embodiments, the method further comprises detecting the configuration of the visual data decryption device comprises detecting one of an eye position of the user, eye orientation of the user, angle of incidence between an eye of the user and an external display, a line of sight of the user.

In some embodiments, the method further comprises, based on detecting the configuration of the visual data decryption device, determining a reading speed and reading position of the user; and based on the reading speed of the user, selectively providing a subset of the set of protected data to the visual data decryption device, wherein the subset of the set of protected data is associated with the reading speed and reading position of the user.

In some embodiments, the method further comprises presenting decrypted data via an image on a display device; detecting a line of sight of the user; and manipulating the image, wherein manipulating the image causes the image to be readable only from the line of sight of the user.

In some embodiments, the method further comprises detecting that the cryptographic private key is subject to a time restriction; determining that the time restriction has been exceeded; and automatically disabling access to the set of protected data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
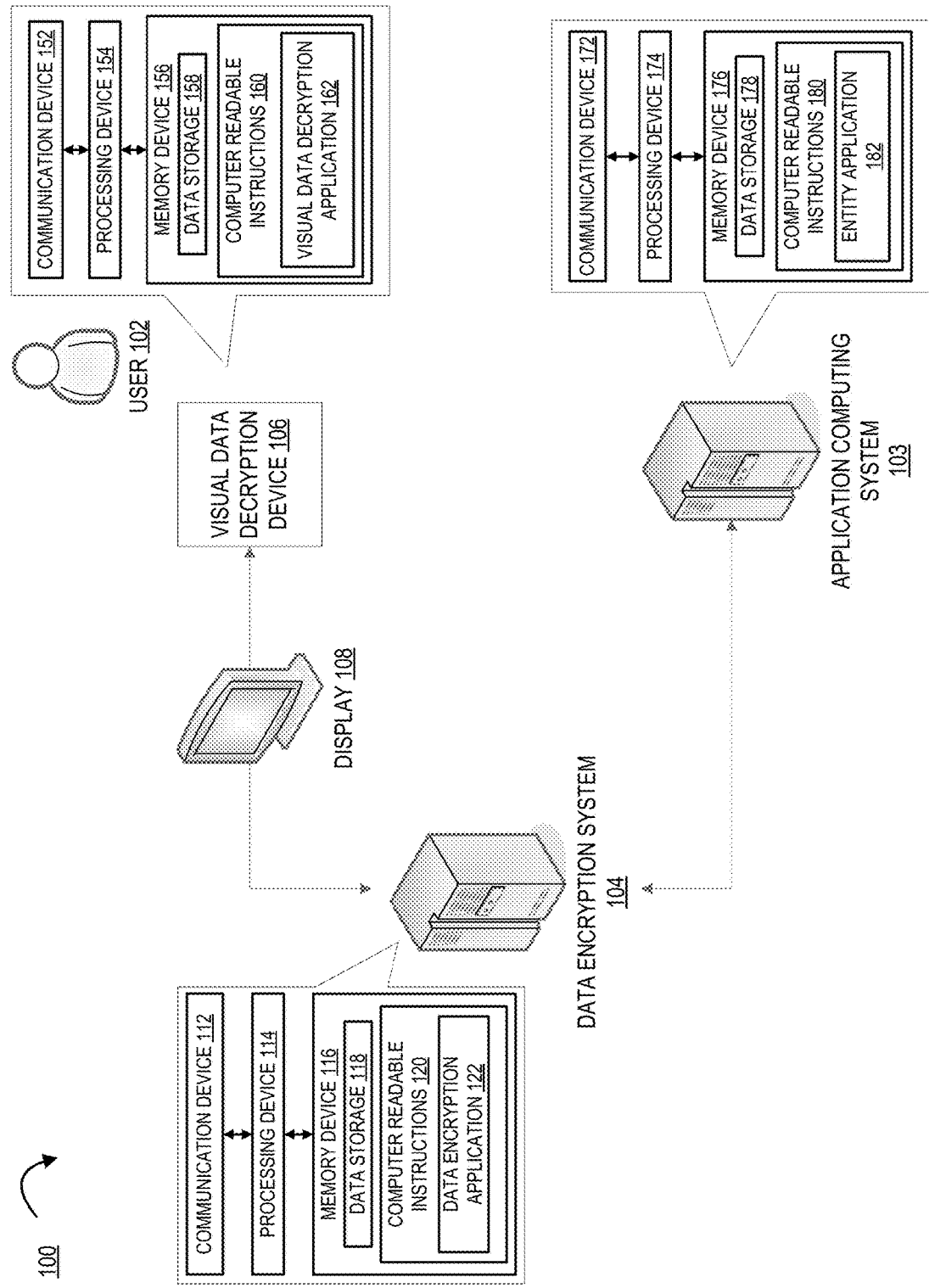
Figure 3:
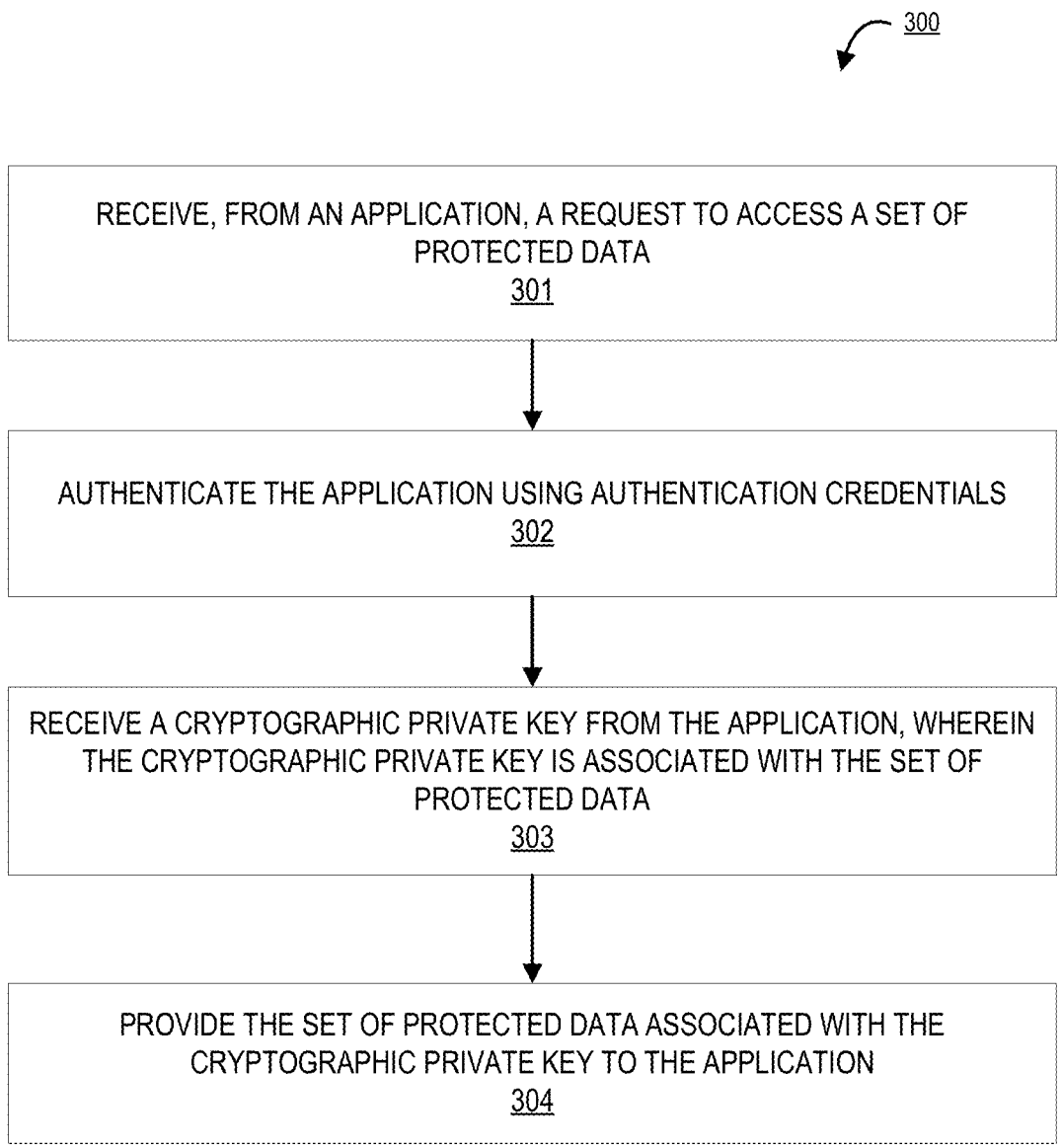

Having thus described embodiments of the invention in general terms, reference will now be made to the accompanying drawings, wherein:

FIG. 1 illustrates an operating environment for the real-time authenticated data obfuscation system, in accordance with one embodiment of the present disclosure;

FIG. 2 illustrates a process flow for providing real-time authenticated visual data obfuscation, in accordance with one embodiment of the present disclosure; and FIG. 3 illustrates a process flow for providing application-level obfuscation of protected data, in accordance with one embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" or "data quality system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

Embodiments of the present disclosure provide a system for real-time authenticated obfuscation of electronic data. The system may encrypt sensitive data using cryptographic keys or key pairs such that only authorized users possessing a private key may decrypt and read the encrypted data. Each private key may be restricted in scope with respect to the types of permitted functions that may be performed on the encrypted data (e.g., view, processing, storage, or writing permissions, or the like). In some embodiments, a private key may correspond to only certain segments of encrypted data (e.g., only selected lines of data may be decrypted using the private key). In some embodiments, the private key may further be subject to time restrictions. For instance, a private key may have an expiry date such that the private key is valid only for a specified timeframe; if such timeframe has passed (e.g., the time restriction has been exceeded), an otherwise valid private key may no longer be used to decrypt the encrypted data. In such embodiments, the system may automatically disable access to the protected data; users and applications may then be required to re-authenticate and provide a new private key to create a new session in order to regain access to the protected data.

In some embodiments, the system may provide for visual obfuscation of displayed data when an unauthorized user attempts to view the displayed data (e.g., via an image distortion algorithm or the like). In such embodiments, the displayed data, if left encrypted, will appear distorted, garbled, and/or undecipherable to unauthorized users or device. In this regard, in some embodiments, the system may comprise a visual data decryption device which may allow an authorized user to decrypt and view data which may be displayed on a display device. Accordingly, the visual data decryption device may be, for example, a wearable device such as smart glasses, virtual/augmented reality goggles, smart contact lenses, or the like. In other embodiments, the visual data decryption device may be integrated into the display device which may selectively display data to an authorized user having a line of sight at a particular three-dimensional angle from a known reference point (e.g., x=0 degrees, y=70 degrees, z=0 degrees) while obfuscating said data (e.g., creating pixelation on a portion or all of the image presented on the display device) if viewed from a different three-dimensional angle. In this regard, the display device may be fixed device such as a computer monitor or television, or the display device may be a mobile device such as a touchscreen or monitor of a smart phone, smart device, wearable device, or other mobile device. In this way, the system may selectively provide visual access to sensitive data to authorized users while preventing visual access to said data to unauthorized users.

In some embodiments, the visual data decryption device may further comprise an eye tracker which tracks the position and/or orientation of an authorized user's eyes in real time. Based on the authorized user's gaze, the system may detect which lines the user has read or is currently reading, which in turn allows the system to calculate the user's reading speed. Based on the user's reading speed, the system may factor the reading speed into the decryption logic for the displayed data such that only the portion of the displayed data which is currently being read by the user is decrypted (e.g., data which lies outside of the data segments that are currently being read by the user may remain encrypted). In this way, the system may selectively decrypt sections of data (e.g., a document) on a real time, as-needed basis. In such embodiments, a user may be required to be re-authenticated and re-authorized to continue to access the encrypted data. In some embodiments, the system may further track the user's read status of certain data (e.g., certain lines have been read or not read by the user) for auditing purposes.

The system may further comprise an application-level data obfuscation system. The application-level data obfuscation system may be configured to assign private keys to certain authorized applications within the entity's operating environment. In such embodiments, applications which require access to sensitive data as part of the application's workflow (e.g., a client management application may require access to client information) may have a decryption key which provides selective access to encrypted data. In some embodiments, the decryption key may be used to automatically provide application-level access to encrypted data. In other embodiments, the decryption keys may be used as part of an approval workflow which may require that a specified user (e.g., an administrator or manager of the entity) approves access and decryption to the requested data.

The authenticated data obfuscation system as described herein provides numerous technological advantages over conventional data security systems. In particular, the visual data decryption device may allow an authorized user to view encrypted displayed data irrespective of the angle at which the data is viewed, in contrast to conventional privacy screens. Furthermore, the partial decryption logic of the system allows the system to selectively decrypt certain segments of data instead of the whole set, which in turn increases the computing efficiency of the data decryption process by decrypting on an as-needed basis.

Turning now to the figures, FIG. 1 illustrates an operating environment 100 for the real-time authenticated data obfuscation system, in accordance with one embodiment of the present disclosure. In particular, FIG. 1 illustrates a data encryption system 104 that is operatively coupled, via a network, to a visual data decryption device 106 and/or an application computing system 103. In such a configuration, the data encryption system 104 may transmit information to and receive information from the visual data decryption device 106 and/or the application computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, the functions of the data encryption system 104 and the application computing system 103 may be executed on a single computing system. Furthermore, a single system, device, or server as depicted in FIG. 1 may represent multiple systems, devices, or servers.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

The visual data decryption device 106 as depicted in FIG. 1 may be a device which provides decryption functions of the encrypted data as provided by the data encryption system 104. In some embodiments, the visual data decryption device 106 may be a wearable device configured to be worn by a user 102, where the wearable device may be smart glasses or goggles, smart contact lenses, virtual and/or augmented reality device, smart visor, or other wearable device comprising a screen for displaying decrypted data. In other embodiments, the visual data decryption device 106 may be integrated into an electronic display which displays the decrypted data to the user 102, where the display may be a monitor or touchscreen with user-tracking sensors (e.g., eye trackers, body part trackers, or the like), a three-dimensional holographic projector, television display, or the like.

Accordingly, the visual data decryption device 106 may comprise a communication device 152, a processing device 154, and a memory device 156. The visual data decryption device 106 may be owned and/or operated by an entity such as an Internet service provider, financial institution, business organization, government agency, or the like. In other embodiments, the visual data decryption device 106 may be owned and/or operated by an individual (e.g., a client of the entity). As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the application computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a visual data decryption application 162. The visual data decryption application 162 may comprise computer-executable program code which may instruct the processing device 154 to perform certain logic, data processing, and data storing functions of the application to accomplish the entity's objectives. For instance, the visual data decryption application 162 may receive encrypted data from the data encryption system 104 and decrypt the data for viewing, as described herein. In some embodiments, the memory device 156 includes data storage 158 for storing data related to the system environment, but not limited to data created and/or used by the visual data decryption application 162. For instance, the data storage 158 may comprise the cryptographic keys (e.g., a private key) which may be used by the visual data decryption device 106 to decrypt the encrypted data and/or a set of encrypted data as specified by the data encryption system 104.

The visual data decryption application 162 may be configured to decrypt visual data presented on a display 108 such that the visual data is visible and readable to the user 102. The display 108 may in some embodiments be an external display such as a monitor, projected image, touchscreen, television, or other type of display device. In other embodiments, such as when the visual data decryption device 106 is a virtual reality or augmented headset, the display 108 may be a component of the visual data decryption device 106. In yet other embodiments, the visual data decryption device 106 may be an internal smart component of the display 108 (e.g., a television with integrated visual data decryption device 106) which selectively decrypts visual data presented on the display 108.

As further illustrated in FIG. 1, the data encryption system 104 may be a computing system within the entity system which encrypts sensitive data (e.g., client information, confidential data, or the like) and selectively provides access to portions of said data to authorized users and/or applications. Accordingly, the data encryption system 104 may comprise a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the visual data decryption device 106 and/or the application computing system 103. As such, the communication device 112 generally comprises a modem, antennae, WiFi or Ethernet adapter, radio transceiver, or other device for communicating with other devices on the network.

The memory device 116 comprises computer-readable instructions 120 and data storage 118, which in one embodiment includes the computer-readable instructions 120 of a data encryption application 122. The data encryption application 122 may comprise executable code for causing the processing device 114 to perform the various data encryption and authentication functions as described herein. For example, the data encryption system 104 may identify sensitive or protected data, encrypt said protected data, authorize and/or authenticate users and/or applications, provide cryptographic private keys corresponding to the protected data and/or segments of protected data, set access restrictions (e.g., time, content, user and/or application, or the like), or other functions with respect to the management of protected data. In this regard, the data encryption system 104 may receive authentication credentials from the user 102, the visual data decryption device 106, and/or the application computing system 103 and authenticate/authorize users and applications based on the authentication credentials. Examples of said authentication credentials may include a username and password combination, PIN, secure token, cryptographic key, biometric data, or the like.

The operating environment 100 may further comprise an application computing system 103. The application computing system 103 may refer to a computing system which may be operated by a user such as an administrator or employee of the entity. The application computing system 103 may, in some embodiments, require access to protected data in order to complete its processes. For instance, the application computing system 103 may host an application which manages confidential data (e.g., personally identifying information). In this regard, the application computing system 103 may interact with the data encryption system 104 to request selective access to the restricted data. Accordingly, the application computing system 103 may comprise a processing device 174 operatively coupled to the communication device 172 and a memory device 176 comprising data storage 178 and computer readable instructions 180. The data storage 178 may comprise, for instance, a cryptographic key provided by the data encryption system 104 to be used in decrypting protected data and/or segments of protected data as regulated by the data encryption system 104.

The computer readable instructions 180 may comprise an entity application 182 which may be configured to instruct the processing device 174 to execute certain functions over the network, such as interacting with the visual data decryption device 106 and/or the data encryption system 104. In particular, the entity application 182 may be configured to request access to a portion of protected data to perform its processes. For example, if the entity application 182 is a client management application, the entity application 182 may require access to protected data which is encrypted by the data encryption system 104. Upon receiving a cryptographic private key from the data encryption system 104, the entity application 182 may use the private key to decrypt and access the relevant portions of protected data. It should be noted that the data encryption system 104 may determine the access needs of the entity application 182 in real-time. For instance, if the entity application 182 requests access to protected data for a particular purpose (e.g., updating information for a particular client), the data encryption system 104 may restrict the permissions of the private key such that the entity application 182 can access only the portions of the protected data that are related to the particular client for whom the operation is being performed.

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the application computing system 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for providing real-time authenticated visual data obfuscation, in accordance with one embodiment of the present disclosure. The process begins at block 201, where the system receives, from a visual data decryption device, a request to access a set of protected data. As described above, the visual data decryption device may be a wearable device or integrated device which provides visual decryption of certain segments of protected data. In an exemplary embodiment, a user may submit a request for protected data while wearing the visual data decryption device, which may be a pair of smart glasses. The smart glasses may be configured to decrypt visual data which may be presented on an external display such that when the user looks at the external display, the decrypted visual data may be visible and readable to the user. In such embodiments, only a user wearing an authorized visual data decryption device may be able to decrypt and view the obfuscated/encrypted visual data. In other embodiments, the visual data decryption device may be an integrated smart component of the external display which selectively decrypts the visual data to be presented to the user.

In embodiments in which the visual data decryption device is an integrated component of the display, the visual data decryption device may be configured to detect the presence of an authorized user and provide selective and exclusive decryption to the authorized user. For instance, the system may detect the presence of a user using biometric information, user interface activity (e.g., movement of mouse or keyboard), touch, visual, and/or auditory sensors, or the like. The system may further detect the position of the user's body (e.g., head and eyes) and angle of line of sight between the authorized user's eyes and the display. If the presence of the authorized user is no longer detected (e.g., the visual data decryption device and/or display device are lost, or if the user steps away from the devices), the device may automatically obfuscate the image presented on the display device until the presence of the authorized user is once again detected (e.g., the user has regained control of the devices). The system may then selectively decrypt visual data such that the decrypted visual data may be viewed only from the line of sight of the authorized user to the exclusion of other viewing angles. Furthermore, the system may automatically disable access to protected data if the presence of the authorized user is not detected (e.g., the user has stepped away from the display and/or computer). Accordingly, the display and/or visual data decryption device may comprise an adaptable light filter or polarizer to provide visualization of data only at certain angles. In other embodiments, the system may manipulate the image displayed on the screen such that the image is readable only at a specific angle and unreadable at other angles. The system may further track, in real time, changes in the line of sight of the authorized user and adjust the decryption of the visual data accordingly in real time such that the authorized user may continue to read the data even if the user changes the position or orientation of the user's body. In this way, if an unauthorized user or device (e.g., a camera) attempts to view or capture the display at a different angle from the authorized user's line of sight, the visual data will remain obfuscated and unreadable. In some embodiments, such as in scenarios in which an unauthorized device attempts to capture a portion of the displayed data, the system may detect the presence of the unauthorized device (e.g., by wireless communication technologies, image recognition, or the like) and dynamically adjust the output settings of the display (e.g., contrast, brightness, sharpness, or the like) to prevent the unauthorized device from capturing a clear image of the display. For instance, the display dynamically may increase or decrease brightness to cause over exposure or under exposure of a captured image, respectively.

The process continues to block 202, where the system authenticates the visual data decryption device using authentication credentials. In this regard, the system may receive authentication credentials from the user through the visual data decryption device. For instance, the visual data decryption device may receive such authentication credentials as a username and password, PIN, biometric information (e.g., retinal scan, fingerprint scan, facial and/or voice sample, or the like), secure token, cryptographic key, or the like. The system may further receive authentication credentials for the visual data decryption device in order to authenticate the visual data decryption device as an approved and authorized device to be used in the decryption process.

The process continues to block 203, where the system receives a cryptographic private key from the visual data decryption device, wherein the cryptographic private key is associated with the set of protected data. A unique private key generated may correspond to a particular segment of protected data such that the user and/or visual data decryption device may exclusively use the private key to access only the protected data corresponding to the private key. In some embodiments, a private key may be subject to a time restriction (e.g., 60 minutes) such that the private key remains valid only within the time restriction. Once the period of time as specified in the restriction has passed, the private key may no longer be used to decrypt the visual data. In some embodiments, the private key may also be used to determine certain permissions with respect to the protected data. For instance, a private key may allow certain operations but not others (e.g., read, write, modify, delete, or the like).

The process continues to block 204, where the system detects a configuration of the visual data decryption device. In some embodiments, the visual data decryption device and/or the external display may comprise a device (e.g., tracker, sensor, camera, or the like) which tracks the gaze of the user (e.g., by detecting eye position, orientation, movement, viewing angle in relation to the display, or the like). Accordingly, the visual data decryption device and/or the external display may make changes in its configuration based on the status of the user. For instance, by tracking the gaze of the user, the system is able to determine the portions of the visual data that the user is attempting to read, and thus may selectively decrypt only the portions of the visual data which are being read by the user or are within a certain range (e.g., a certain number of characters or lines) of the portions being read by the user. In one embodiment, the data encryption system may provide segments of protected data to be decrypted by the visual data decryption device based on the user's gaze. In some embodiments, the system may further maintain a record of the portions of visual data read by the user for auditing purposes. For instance, the system may use eye tracking to record that a particular user (e.g., a particular employee of the entity) has read a required document (e.g., a data privacy agreement).

The process concludes at block 205, where the system, based on the configuration of the visual data decryption device, provides the set of protected data associated with the cryptographic private key to the visual data decryption device for decryption. In particular, the data encryption system may selectively provide certain portions of the set of protected data to the visual data decryption device. For instance, the visual data decryption device may detect an eye position and/or reading speed of the user. The eye position and/or reading speed of the user may in turn be added to the decryption logic of the system such that the data encryption system provides only the section of the protected data that is currently being read or is within a certain range (e.g., certain lines) of the protected data currently being read. In this way, the system may control visual access to protected data on a per-user, as-needed basis.

FIG. 3 illustrates a process flow 300 for providing application-level obfuscation of protected data, in accordance with one embodiment of the present disclosure. The process begins at block 301, where the system receives, from an application, a request to access a set of protected data. The application may be, for instance, an entity application which requires access to protected data to perform its functions. In this regard, the entity application may be, for example, an application which manages private or personally identifying information of an entity's clients (e.g., a client management application). In such embodiments, the protected data may represent the private information to be read and/or processed by the application.

The process continues to block 302, where the system authenticates the application using authentication credentials. Each application may provide authentication credentials to the system to identify itself as an authorized application within the entity's operating environment. Accordingly, such authentication credentials may include a secure token, application identifier, authorization key, or the like.

The process continues to block 303, where the system receives a cryptographic private key from the application, wherein the cryptographic private key is associated with the set of protected data. As described above, each private key may be tied to a set of protected data such that the private key may only be used to access the set of protected data to which the private key corresponds.

The process continues to block 304, where the system provides the set of protected data associated with the cryptographic private key to the application. In some embodiments, the data encryption system may send encrypted data to the application computing system to be decrypted. In other embodiments, the data encryption system may perform decryption of the set of protected data before sending the decrypted set of protected data to the application for processing. In some embodiments, the system may cause the decrypted protected data to be re-encrypted (e.g., by the application computing system and/or the data encryption system) upon completion of the application's processes such that the data remains decrypted only as needed. In this way, the system may further provide for application-level encrypted access to protected data.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for real-time authenticated visual obfuscation of electronic data, the system comprising:
   a memory device with computer-readable program code stored thereon;
   a communication device; and
   a processing device operatively coupled to the memory device and the communication device, wherein the processing device is configured to execute the computer-readable program code to:
   receive, from a visual data decryption device, a request to access a set of protected data;
   receive authentication credentials from the visual data decryption device;
   authenticate the visual data decryption device using the authentication credentials;
   receive a cryptographic private key from the visual data decryption device, wherein the cryptographic private key is associated with the set of protected data, wherein the set of protected data comprises a document file comprising a plurality of lines, wherein the private key corresponds to only selected lines of data within the plurality of lines of the set of protected data;
   detect a configuration of the visual data decryption device, wherein detecting the configuration of the visual data decryption device comprises tracking a gaze of an eye of a user based on a position and orientation of the eye of the user;
   computing a reading speed of the user based on the gaze of the eye of the user;

based on the configuration of the visual data decryption device, provide the set of protected data to the visual data decryption device for output on a display associated with the visual data decryption device, wherein providing the set of protected data to the visual data decryption device comprises selectively decrypting the set of protected data based on the selected lines of data within the set of protected data to which the private key corresponds, wherein providing the set of protected data to the visual data decryption device further comprises selectively decrypting, in real time, the selected lines of data based on the reading speed and the gaze of the eye of the user;

detect a presence of an unauthorized device; and based on detecting the presence of the unauthorized device, dynamically adjust a brightness of the display to thereby visually obfuscate display of the set of protected data.

2. The system according to claim 1, wherein adjusting the brightness of the display causes an under-exposure or over-exposure of the display.

3. The system according to claim 1, wherein the computer-readable program code further causes the processing device to:

detect a presence of an unauthorized device; and based on detecting the presence of the unauthorized device, dynamically adjusting a brightness of a display to cause under-exposure or over-exposure of the display.

4. The system according to claim 1, wherein the visual data decryption device is a virtual reality headset, augmented reality headset, pair of smart glasses, pair of smart goggles, or pair of smart contacts.

5. The system according to claim 1, wherein the visual data decryption device is an integrated smart component of a display device.

6. The system according to claim 1, wherein the computer-readable program code further causes the processing device to:

detect that the cryptographic private key is subject to a time restriction;

determine that the time restriction has been exceeded; and automatically disable access to the set of protected data.

7. A computer-implemented method for real-time authenticated visual obfuscation of electronic data, the method comprising:

receiving, from a visual data decryption device, a request to access a set of protected data;

receiving authentication credentials from the visual data decryption device;

authenticating the visual data decryption device using the authentication credentials;

receiving a cryptographic private key from the visual data decryption device, wherein the cryptographic private key is associated with the set of protected data, wherein the set of protected data comprises a document file comprising a plurality of lines, wherein the private key corresponds to only selected lines of data within the plurality of lines of the set of protected data;

detecting a configuration of the visual data decryption device, wherein detecting the configuration of the visual data decryption device comprises tracking a gaze of an eye of a user based on a position and orientation of the eye of the user;

computing a reading speed of the user based on the gaze of the eye of the user; and based on the configuration of the visual data decryption device, providing the set of protected data to the visual data decryption device, wherein providing the set of protected data to the visual data decryption device comprises selectively decrypting the set of protected data based on the selected lines of data within the set of protected data to which the private key corresponds, wherein providing the set of protected data to the visual data decryption device further comprises selectively decrypting, in real time, the selected lines of data based on the reading speed and the gaze of the eye of the user.

8. The method of claim 7, the method further comprising:

detecting a presence of an unauthorized user; and performing visual obfuscation of the protected data, wherein the visual obfuscation causes the protected data to be undecipherable.

9. The method of claim 7, the method further comprising:

detecting that the cryptographic private key is subject to a time restriction;

determining that the time restriction has been exceeded; and automatically disabling access to the set of protected data.

* * * * *